(12) United States Patent
Kalsi et al.

(10) Patent No.: US 7,619,345 B2
(45) Date of Patent: Nov. 17, 2009

(54) STATOR COIL ASSEMBLY

(75) Inventors: Swarn S. Kalsi, Shrewsbury, MA (US); Dariusz Antoni Bushko, Hopkinton, MA (US)

(73) Assignee: American Superconductor Corporation, Westborough, MA (US)

( * ) Notice: Subject to any disclaimer, the term of this patent is extended or adjusted under 35 U.S.C. 154(b) by 557 days.

(21) Appl. No.: 11/344,585

(22) Filed: Jan. 30, 2006

(65) Prior Publication Data

US 2007/0176509 A1    Aug. 2, 2007

(51) Int. Cl.
*H02K 3/04* (2006.01)
(52) U.S. Cl. .................. 310/208; 310/206; 310/203; 310/266
(58) Field of Classification Search ............ 310/52, 310/54, 58, 203, 206, 208, 266, 268
See application file for complete search history.

(56) References Cited

U.S. PATENT DOCUMENTS

| 1,761,387 | A | 6/1930 | Gay |
| 1,959,527 | A | 5/1934 | Ehrmann |
| 2,844,745 | A | 7/1958 | Hamm |
| 3,049,634 | A | 8/1962 | Horsley |
| 3,184,624 | A | 5/1965 | Solomon |
| 3,469,126 | A | 9/1969 | Wiedmann |
| 3,681,628 | A | 8/1972 | Krastchew |
| 3,801,843 | A | 4/1974 | Corman et al. |
| 3,963,950 | A | 6/1976 | Watanabe et al. |
| 4,019,075 | A | * 4/1977 | Kagami ............ 310/206 |
| 4,123,676 | A | 10/1978 | Cooper et al. |
| 4,126,798 | A | 11/1978 | Carr et al. |
| 4,128,805 | A | 12/1978 | Lanz |
| 4,179,635 | A | 12/1979 | Beermann |
| 4,227,907 | A | 10/1980 | Merritt |
| 4,228,375 | A | 10/1980 | Beermann et al. |

(Continued)

FOREIGN PATENT DOCUMENTS

GB    A-739896    11/1955

(Continued)

OTHER PUBLICATIONS

Anderson, et al., "Electric Motors", pp. 24-27 (1986).

*Primary Examiner*—Truc T Nguyen
*Assistant Examiner*—Jason Collins
(74) *Attorney, Agent, or Firm*—Occhiuti Rohlicek & Tsao LLP (57) ABSTRACT

A stator coil assembly includes a cylindrical support tube with first and second pluralities of stator coils disposed radially around the support tube. Each stator coil includes first, second, third, and fourth linear segments, each having first and second planar broad sides. The second and fourth linear segments extend in parallel along a first axis with the first and second broad sides of the second and fourth linear segments lying in a common plane. The first and third linear segments extend in parallel along a second axis perpendicular to the first axis. Transition segments having first and second planar broad sides each join a pair of linear segments. The transition segments of the first and second pluralities of stator coils define curvatures toward and away from the center axis, respectively, such that the first and third linear segments are disposed at a substantially equal radial distance from the center axis.

10 Claims, 6 Drawing Sheets

U.S. PATENT DOCUMENTS

| | | | |
|---|---|---|---|
| 4,328,551 | A | 5/1982 | Yamaura et al. |
| 4,330,726 | A | 5/1982 | Albright et al. |
| 4,352,034 | A | 9/1982 | Karhan et al. |
| 4,356,419 | A | 10/1982 | Boer et al. |
| 4,385,248 | A | 5/1983 | Laskaris |
| 4,427,907 | A | 1/1984 | Flick et al. |
| 4,709,180 | A | 11/1987 | Denk |
| 4,797,588 | A | 1/1989 | Capion |
| 5,053,663 | A | 10/1991 | Boer et al. |
| 5,091,666 | A | 2/1992 | Jarczynski |
| 5,397,953 | A | 3/1995 | Cho |
| 5,610,501 | A | 3/1997 | Nelson et al. |
| 5,632,157 | A | 5/1997 | Sekino et al. |
| 5,672,921 | A | 9/1997 | Herd et al. |
| 5,731,643 | A | 3/1998 | Avakian et al. |
| 5,744,896 | A * | 4/1998 | Kessinger et al. ........... 310/268 |
| 5,777,420 | A | 7/1998 | Gamble et al. |
| 5,808,387 | A | 9/1998 | Akachi et al. |
| 5,863,467 | A | 1/1999 | Mariner et al. |
| 5,866,959 | A | 2/1999 | Le Flem |
| 5,886,444 | A | 3/1999 | Enomoto et al. |
| 5,936,502 | A | 8/1999 | Englund et al. |
| 6,157,109 | A | 12/2000 | Schiferl et al. |
| 6,208,056 | B1 | 3/2001 | Perkins |
| 6,313,556 | B1 | 11/2001 | Dombrovski et al. |
| 6,489,701 | B1 * | 12/2002 | Gamble et al. ............. 310/179 |
| 6,879,081 | B1 | 4/2005 | Howard et al. |
| 7,211,919 | B2 | 5/2007 | Kalsi et a |
| 2001/0035692 | A1 | 11/2001 | Ong et al. |
| 2002/0079775 | A1 * | 6/2002 | Janssen et al. ............. 310/208 |
| 2003/0052568 | A1 | 3/2003 | Howard |
| 2004/0021391 | A1 | 2/2004 | Jones et al. |
| 2007/0200440 | A1 | 8/2007 | Kalsi et al. |

FOREIGN PATENT DOCUMENTS

| | | | |
|---|---|---|---|
| JP | 55083449 A * | 6/1980 | |
| JP | 59-089568 | 5/1984 | |
| JP | 59-106871 | 5/1984 | |
| JP | 62-196683 | 8/1987 | |
| JP | 50-66708 | 3/1993 | |
| JP | 06-327231 | 11/1994 | |
| JP | 7-23540 | 1/1995 | |
| JP | 09046975 | 2/1997 | |
| JP | 2003 070197 | 3/2003 | |
| WO | WO01/13496 A1 | 2/2001 | |
| WO | WO01/41283 | 6/2001 | |
| WO | WO01/51863 | 7/2001 | |
| WO | WO01/52276 | 7/2001 | |
| WO | WO01/52383 | 7/2001 | |
| WO | WO01/52391 | 7/2001 | |
| WO | WO01/52392 | 7/2001 | |
| WO | WO01/58005 | 8/2001 | |
| WO | WO02/13360 | 2/2002 | |
| WO | WO02/13361 | 2/2002 | |
| WO | WO02/073584 | 9/2002 | |
| WO | WO03/007462 | 1/2003 | |
| WO | WO2004/017500 | 2/2004 | |

* cited by examiner

STATOR COIL ASSEMBLY

RELATED APPLICATIONS

The following applications are hereby incorporated by reference into the subject application as if set forth herein in full: (1) U.S. Pat. No. 6,359,365, entitled "Superconducting Synchronous Machine Field Winding Protection"; (2) U.S. application Ser. No. 09/632,602, filed Aug. 4, 2000, entitled "Segmented Rotor Assembly For Superconducting Rotating Machines"; (3) U.S. application Ser. No. 09/632,600, filed Aug. 4, 2000, entitled "Exciter For Superconducting Rotating Machinery"; (4) U.S. Pat. No. 6,879,081, entitled "Stator Support Assembly For Superconducting Rotating Machines"; (5) U.S. Pat. No. 6,428,842, entitled "Exciter and Electronic Regulator for Rotating Machinery"; (6) U.S. application Ser. No. 09/480,397, filed Jan. 11, 2000, entitled "Stator Construction For Superconducting Rotating Machines"; (7) U.S. Pat. No. 6,693,504, entitled "Internal Support for Superconducting Wires"; (8) U.S. Pat. No. 6,347,522, entitled "Cooling System for HTS Machines"; (9) U.S. Pat. No. 6,489,701, entitled "Superconducting Rotating Machine"; (10) U.S. Application No. 60/266,319, filed Jan. 11, 2000, entitled "HTS Superconducting Rotating Machine"; (11) U.S. Pat. No. 6,664,672, entitled "Enhancement of Stator Leakage Inductance in Air-Core Machines"; and (12) U.S. Pat. No. 7,282,832, entitled "Axially-Expandable EM Shield".

TECHNICAL FIELD

The present disclosure relates to rotating machines, and more particularly, to rotating machines incorporating stator coils.

BACKGROUND

A rotating electric machine includes a stator coil assembly having multiple stator coils. Machines incorporating high temperature superconductor (HTS) stator materials experience a significant increase in the field electromotive forces generated by the windings and increased flux and power densities of the machines as compared to conventional "non-superconducting" rotating machines incorporating iron-toothed stators. Furthermore, in HTS based electrical machines, the stator coils are the sole recipients of the Lorenz magnetic force, in contrast to conventional stators where most of the force is dissipated through the iron teeth.

The stator coils are positioned radially about the perimeter of a cylindrical support structure. The desired number of magnetic poles dictates the number of stator coils included in the assembly. "Racetrack" type stator coils have two straight sections disposed parallel to a center axis of the cylindrical support structure and two end turn regions linking the straight sections. The straight sections are the active sections through which current must flow to electromagnetically engage a rotor assembly, causing it to rotate.

In addition to the heat generated by the rotor assembly, the stator assembly also generates a considerable amount of heat that must be removed in order for the superconducting machine to operate efficiently. In conventional "non-superconducting" rotating machines, iron teeth are utilized between the individual stator coil assemblies, which act as heat sinks and remove the heat generated by the stator assembly. However, in superconducting machines, the flux density is so great between these stator coil assemblies that these iron teeth would immediately become saturated, resulting in Eddy current heating and operating inefficiency.

SUMMARY

According to an aspect of the disclosure, a stator coil assembly includes a cylindrical support tube with first and second pluralities of stator coils disposed radially around the support tube. Each stator coil includes first, second, third, and fourth linear segments, each having first and second planar broad sides. The second and fourth linear segments extend in parallel along a first axis with the first and second broad sides of the second and fourth linear segments lying in a common plane. The first and third linear segments extend in parallel along a second axis perpendicular to the first axis. Transition segments having first and second planar broad sides each join a pair of the linear segments. In one configuration, the transition segment comprises three curved portions. The transition segments of the first plurality of stator coils define curvatures away from the center axis and the transition segments of the second plurality of stator coils define curvatures towards the center axis such that the first and third linear segments are disposed at a substantially equal radial distance from the center axis. The planar broad sides of the transition segments joined to the first linear segment lie in planes parallel to the planar broad sides of the first linear segment, and the planar broad sides of the transition segments joined to the third linear segment lie in planes parallel to the planar broad sides of the third linear segment. In some embodiments, an axis normal to the first planar broad side of each segment intersects a common center axis. Also, the first, second, third, and fourth linear segments define substantially rectangular cross sections.

In some embodiments, the stator coil includes a shell with at least one pancake coil disposed within the shell and comprising a plurality of conductive wires wherein the linear segments have substantially uniform cross-sectional area and substantially uniform cross-sectional wire density. The stator coil includes a plurality of bundles of conductive wires where in one aspect the conductive wires comprise Litz wires. At least one spacer having opposing sides is positioned between the pancake coil and the shell, an opposing side of the spacer and the pancake coil define in part a cooling channel. In one example, a plurality of pancake coils are disposed within the shell along with a plurality of spacers positioned between the pancake coils and the shell, as well as between the pancake coils, defining a plurality of coolant channels.

In another aspect, an inlet coolant manifold is disposed at a first end of the support tube and an outlet coolant manifold is disposed at a second end of the support tube. The fourth linear segments of the stator coils are joined to the inlet coolant manifold for introducing a flow of a coolant through the stator coils and the second linear segments of the stator coils are joined to the outlet coolant manifold for receiving the flow of coolant out of the stator coils.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
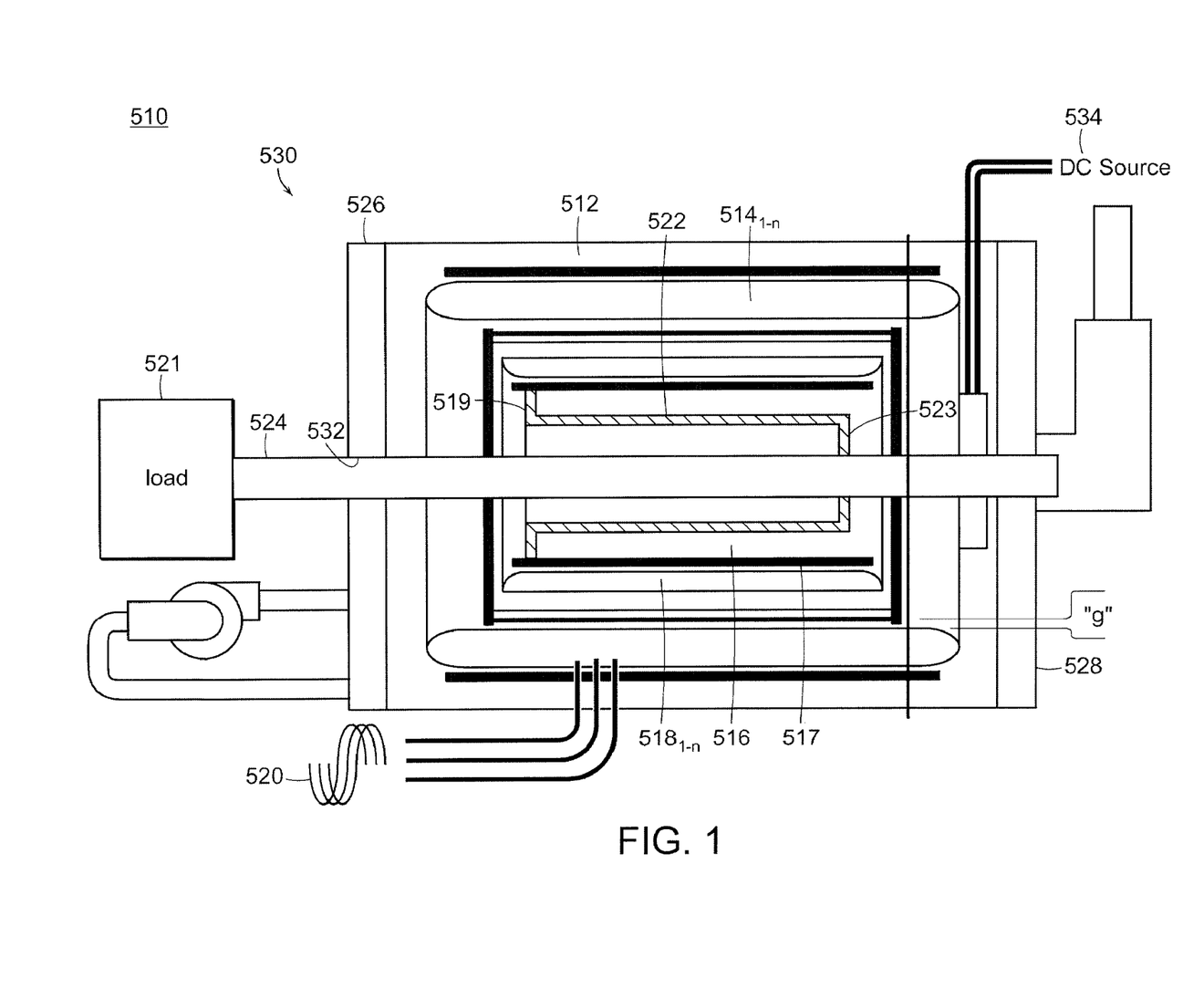
FIG. 1 is a perspective view of an electric machine.

Referring to FIG. 1, a superconducting rotating machine 510 has a stator assembly 512 including stator coil assemblies $514_{1-n}$. The specific number of stator coil assemblies $514_{1-n}$ included within stator assembly 512 varies depending on various design criteria, such as speed, voltage and frequency during operation. For example, in one 33,000 horsepower superconducting machine design, stator assembly 512 includes one hundred and eighty stator coil assemblies $514_{1-n}$. These stator coil assemblies $514_{1-n}$ are mounted on a stator coil support structure that is constructed of a non-magnetic, thermally-conductive material, thus minimizing Eddy current heating and the resulting stator inefficiencies.

A rotor assembly 516 rotates within stator assembly 512. As with stator assembly 512, rotor assembly 516 includes rotor winding assemblies $518_{1-n}$. In the same 33,000 horsepower superconducting machine design, rotor assembly 516 includes sixteen rotor winding assemblies $514_{1-n}$. These rotor winding assemblies, during operation, generate a magnetic flux that links rotor assembly 516 and stator assembly 512.

By supplying power through supply voltage 520 to stator coil assemblies $514_{1-n}$, machine 510 is brought up to its operating speed. The torque generated by this now-rotating rotor assembly 516 is transferred to a load 521 (e.g., a propeller shaft of a ship, a conveyor belt on a production line, the drive wheels of a diesel locomotive, etc.). The rotor winding assemblies $514_{1-n}$ are mounted on a support structure 517 which is connected to a first flange 519 that transfers the motor torque to a torque tube 522. Torque tube 522 is connected to a second flange 523, which is connected to an output shaft 524. Flanges 519 and 523 may be incorporated into torque tube 522 or may be separate assemblies.

Output shaft 524 is supported by a pair of bearing plates 526, 528, one at each end of rotor assembly 516. The bearing plate 526 on the drive end 530 of superconducting rotating machine 510 contains a passage 532 through which output shaft 524 passes. Additionally, bearing plate 528 may also have a passage through which the output shaft 524 passes. Bearing plates 526, 528 position rotor assembly 516 at the proper position within stator assembly 512 so that rotor assembly 516 can freely rotate within stator assembly 512 while maintaining the proper gap "g" between rotor assembly 516 and stator assembly 512.

Figure 2:
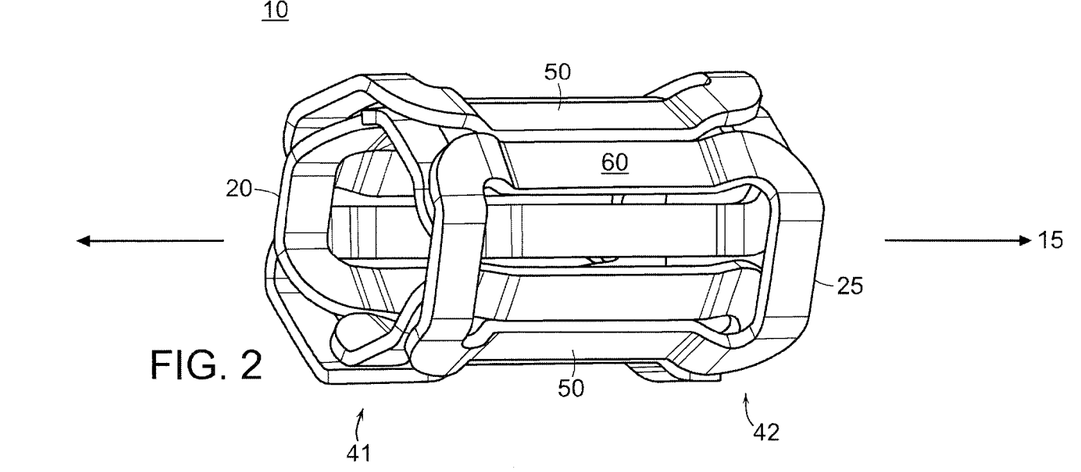
FIG. 2 is a perspective view of a stator coil winding assembly.
Figure 3:
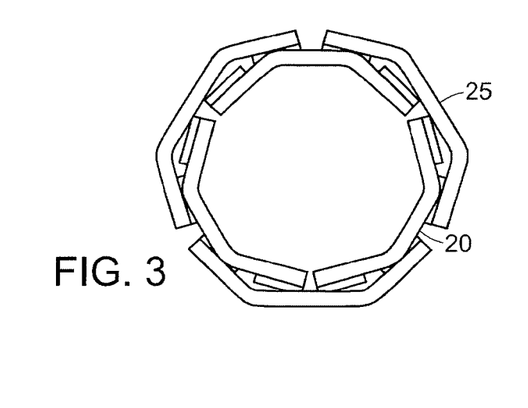
FIG. 3 is a front view of a stator coil winding assembly.
Figure 4:
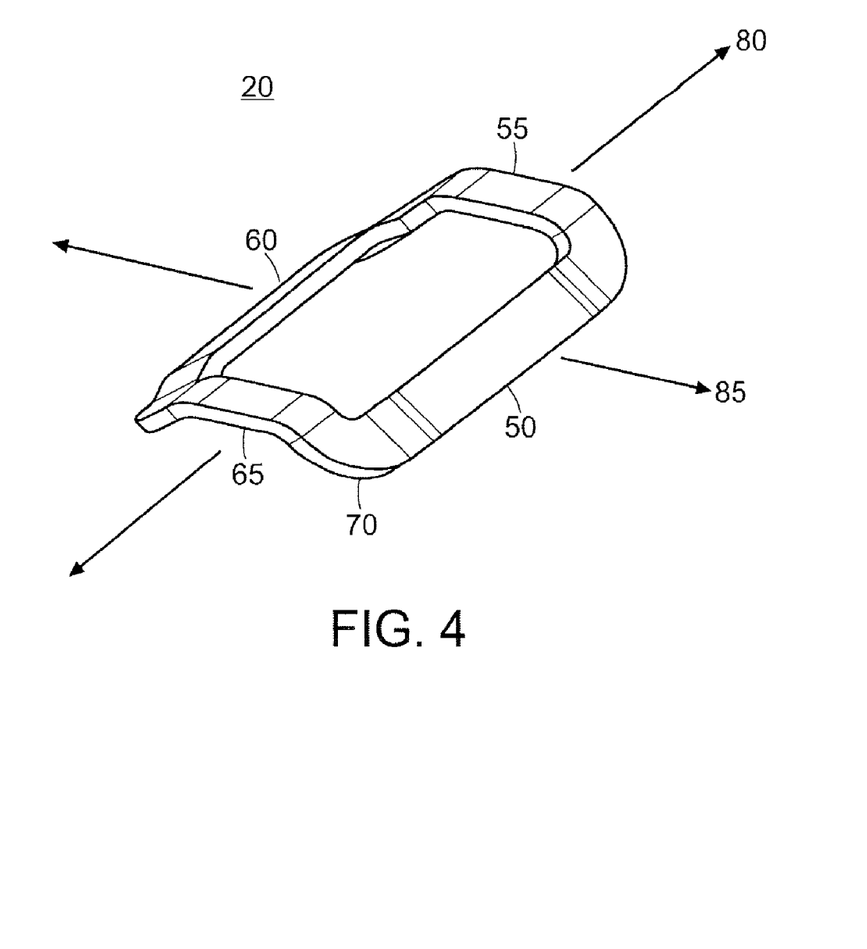
FIG. 4 is a perspective view of a stator coil winding in accordance with an embodiment of the disclosure.
Figure 5:
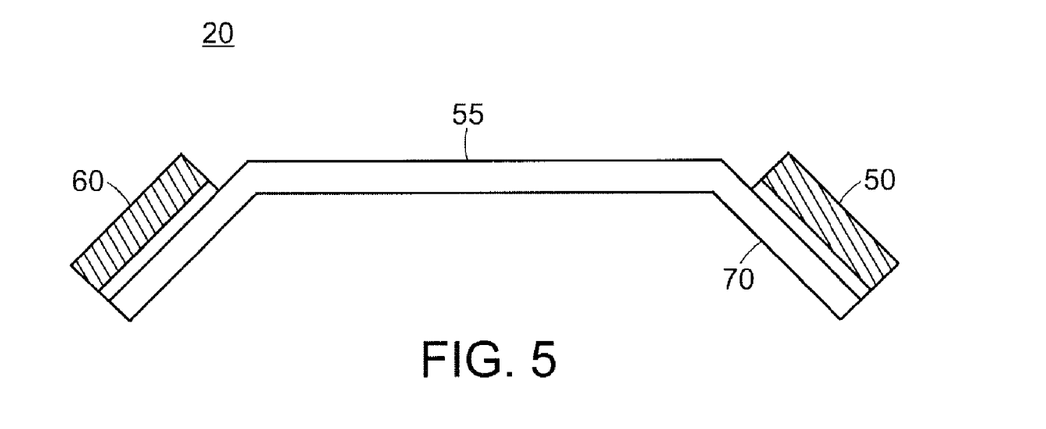
FIG. 5 is a sectional view of a stator coil winding in accordance with an embodiment of the disclosure.
Figure 6:
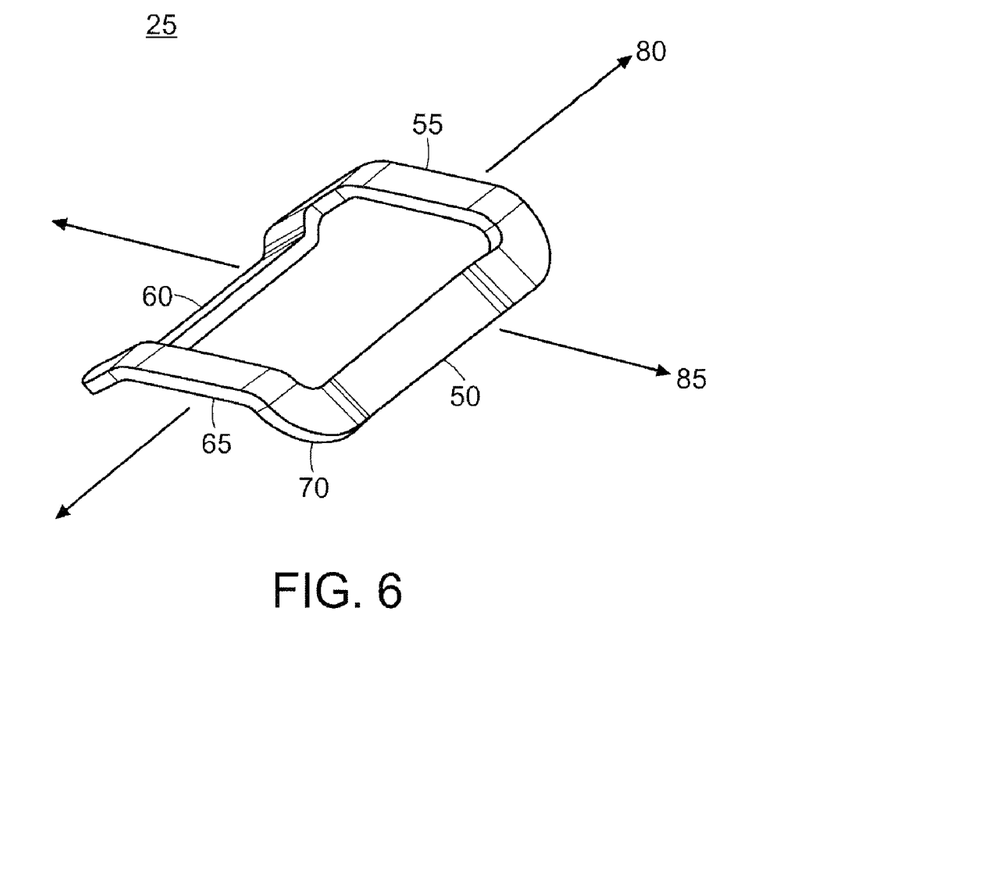
FIG. 6 is a perspective view of a stator coil winding in accordance with an embodiment of the disclosure.
Figure 7:
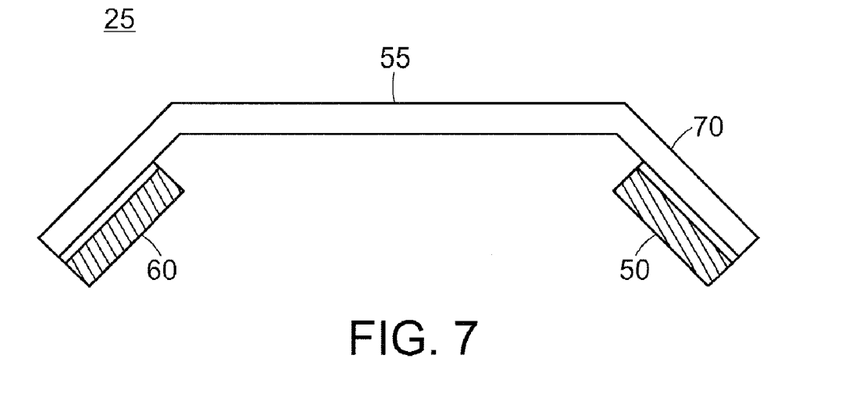
FIG. 7 is a sectional view of a stator coil winding in accordance with an embodiment of the disclosure.

Referring to FIGS. 2-3, a stator coil assembly 10 includes multiple stator coils 20, 25 disposed radially about a center axis 15. In this embodiment for a 4-pole machine, the stator assembly 10 comprises six stator coils, three inner coils 20 and three outer coils 25. The inner and outer stator coils 20, 25 have slightly different geometries. The stator coil assembly 10 includes a first layer of inner stator coils 20 and a second layer of outer stator coils 25 arranged over the inner stator coils 20 such that the axially aligned linear segments 50, 60 of the inner and outer stator coils 20, 25 have a substantially equal radial distance from the center axis 15. End regions 41, 42 of the outer stator coils 25 overlap the end turn regions 41, 42 of the inner stator coils 20 as shown in FIG. 3. The benefits of this geometry include geometrically decoupling the end turn regions 41, 42 from the axially aligned linear segments 50, 60, allowing modification of functional features of the axially aligned linear segments 50, 60, such as conductor packing fraction, irrespective from the size of the end turn regions 41, 42.

Referring to FIGS. 4-7, each stator coil 20, 25 has four linear segments, which include two axially aligned linear segments 50, 60 and two end turn linear segments 55, 65, each having first and second planar broad sides. Transition segments 70, each having first and second planar broad sides, join an axially aligned linear segment 50, 60 with an end turn linear segment 55, 65. The axially aligned linear segments 50, 60 extend in parallel along a first axis 80, and the end turn linear segments 55, 65 extend in parallel along a second axis 85 perpendicular to the first axis 85. In this embodiment, the planar broad sides of the end turn linear segments 55, 65 reside in common planes. Likewise, the planar broad sides of the transition segments 70 joined to an axially aligned linear segment 50, 60 lie in parallel planes with the planar broad sides of that axially aligned linear segment 50, 60. An axis normal to the first planar broad side of each linear segment 50, 55, 60, 65, through the center of each of the respective planar broad sides, intersects the common center axis 15 (see FIG. 2). The linear segments 50, 55, 60, 65 illustrated in FIGS. 4-7 are substantially rectangular in cross-section. Furthermore, a cross-section at any one point in the stator coil 20, 25 is identical to a cross-section at substantially every other point in the stator coil 20, 25.

The transition segment 70 includes three curved portions. The transition segments 70 of the inner stator coils 20 define curvatures away from the center axis 15, while the transition segments 70 of the outer stator coils 25 define curvatures towards the center axis 15 such that the axially aligned linear segment 50, 60 of the inner and outer stator coils 20, 25 are disposed at a substantially equal radial distance from the center axis 15.

Figure 8:
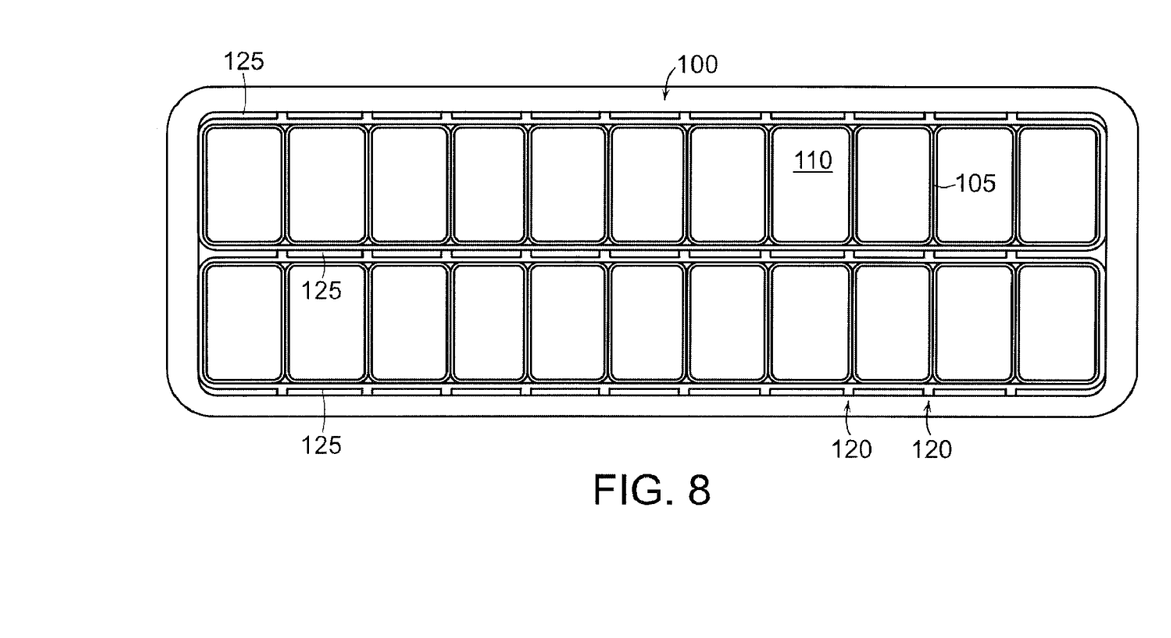
FIG. 8 is a sectional view of a stator coil winding in accordance with an embodiment of the disclosure.
Figure 9:
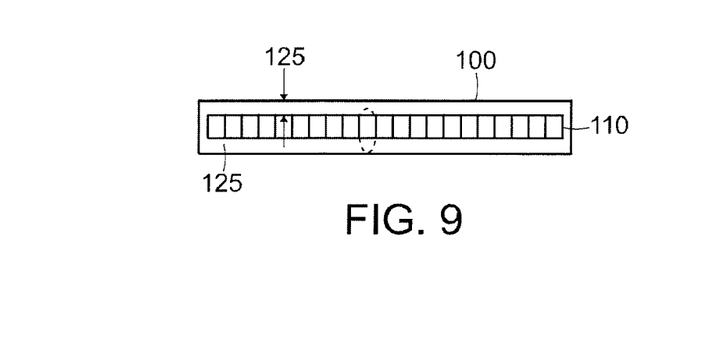
FIG. 9 is a sectional view of a stator coil winding in accordance with an embodiment of the disclosure.

Referring to FIGS. 8-9, a stator coil 20, 25 has at least one pancake coil 110 comprising conductive wires and is disposed within a shell 100. Turn insulation 105 is disposed between two or more pancake coils 110. In this embodiment, the conductive wires of the pancake coil include encapsulated Litz wire bundles that act as self-supporting structural components and are thermally adiabatic with respect to their environment. Spacers 120 are positioned between the shell 100 walls and the pancake coil 110, as well as between pancake coils 110, if more than one. A side of the spacer 120 and the pancake coil define in part a coolant channel 125. The spacers 120 comprise a composite material such as glass epoxied sheets (commercially known as G10).

In another aspect, the stator coils 20, 25 are cooled by introducing a flow of coolant through the cross-section via the one or more coolant channels 125. The forced liquid coolant may comprise de-ionized water or dielectric oil. The coolant enters the first end turn region 41 of the stator coil 20, 25 and exits the second end turn region 42 opposite of the first end turn region 41. In one embodiment using oil as the coolant, thin coolant channels 125 are employed. Preferably, cooling channels 125 with cross-sections of about 1 mm wide can achieve a surface heat transfer coefficient of about 1000 W/mK. Furthermore, an effective flow velocity is about 3 m/s with a Nusselt number of between about 7 to 10.

Figure 10:
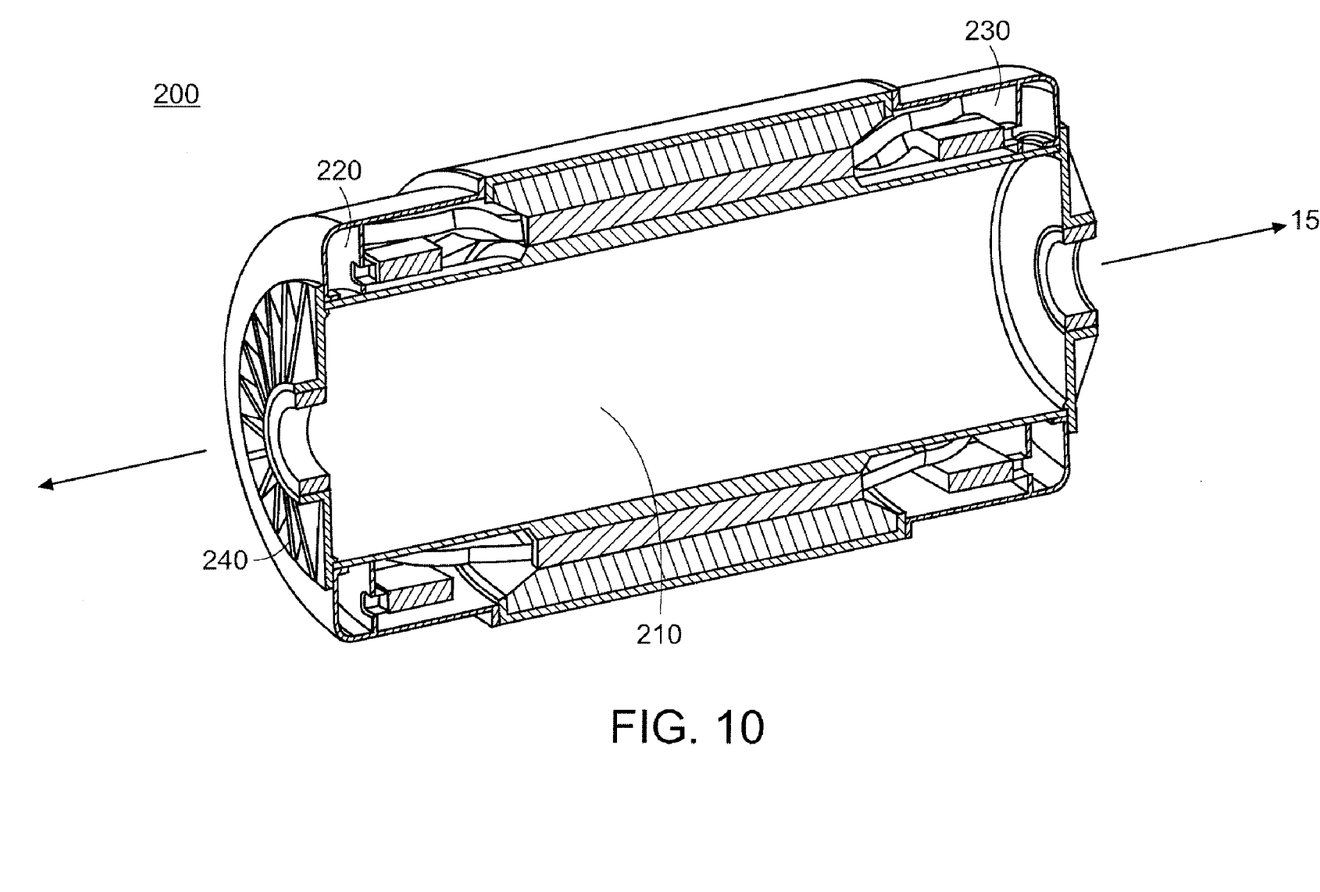
FIG. 10 is a sectional view of a stator coil winding cooling system.

Referring to FIG. 10, a stator coil assembly 200 includes a cylindrical support 210 with inlet and outlet coolant manifolds 220, 230 disposed on opposite ends of the cylindrical support tube 210. A plurality of inner and outer stator coils 20, 25 are disposed radially around the cylindrical support 210. In this embodiment, three inner stator coils 20 are disposed over the support tube 210 and three outer stator coils 25 are disposed over the inner stator coils 20 such that the axially aligned linear segments 50, 60 are disposed at a substantially equal radial distance from the center axis 15. The end turn linear segments 65 of the first end turn region 41 of the stator coils 20, 25 are joined to the inlet coolant manifold 220 for introducing a flow of a coolant through the stator coils 20, 25 and the end turn linear segments 55 of the second end turn region 42 of the stator coils 20, 25 are joined to the outlet coolant manifold 230 for receiving the flow of coolant out of the stator coils 20, 25. An end plate 240 is disposed on both ends of the assembly over the inlet and outlet coolant manifolds 220, 230.

A number of embodiments of the invention have been described. Nevertheless, it will be understood that various modifications may be made without departing from the spirit and scope of the invention. Accordingly, other embodiments are within the scope of the following claims. For example, the stator coils 20, 25 may have cross-sectional geometries other than rectangular.

What is claimed is:

1. A stator coil comprising:
    first, second, third, and fourth linear segments, each having first and second planar broad sides; and
    transition segments, each having first and second planar broad sides and each joining a pair of the linear segments;
    the second and fourth linear segments extending in parallel along a first axis, the first and second broad sides of the second and fourth linear segments lying in a common plane;
    the first and third linear segments extending in parallel along a second axis perpendicular to the first axis, and the first and second broad sides of the first and third linear segments lying in different planes;
    the first planar broad side of each of the first, second, third and fourth linear segments being normal to a line that intersects a common third axis, the third axis parallel to the second axis; and
    the respective first planar broad sides of each linear segment and each transition segment being continuous.

2. The stator coil of claim 1 wherein the first, second, third, and fourth linear segments define substantially rectangular cross sections.

3. The stator coil of claim 1 wherein
    the planar broad sides of the transition segments joined to the first linear segment lie in planes parallel to the planar broad sides of the first linear segment, and
    the planar broad sides of the transition segments joined to the third linear segment lie in planes parallel to the planar broad sides of the third linear segment.

4. The stator coil of claim 1 wherein an axis normal to the first planar broad side of each segment intersects a common center axis.

5. The stator coil of claim 1 wherein each transition segment comprises three curved portions.

6. The stator coil of claim 1, further comprising at least one pancake coil comprising a plurality of conductive wires wherein the linear segments have substantially uniform cross-sectional area and substantially uniform cross-sectional wire density.

7. The stator coil of claim 6, further comprising a plurality of bundles of conductive wires.

8. The stator coil of claim 6 wherein the conductive wires comprise Litz wires.

9. A stator coil assembly comprising:
    a cylindrical support tube having first and second ends;
    first and second pluralities of stator coils disposed radially around the support tube about a center axis, each stator coil comprising:
        first, second, third, and fourth linear segments, each having first and second planar broad sides; and
        transition segments, each having first and second planar broad sides and each joining a pair of the linear segments;
        the second and fourth linear segments extending in parallel along a first axis, the first and second broad sides of the second and fourth linear segments lying in a common plane; and
        the first and third linear segments extending in parallel along a second axis perpendicular to the first axis and lying in different planes; wherein
    the transition segments of the first plurality of stator coils defining curvatures away from the center axis and the transition segments of the second plurality of stator coils defining curvatures toward the center axis such that the first and third linear segments are disposed at a substantially equal radial distance from the center axis.

10. The stator coil assembly of claim 9, further comprising:
    an inlet coolant manifold disposed at the first end of the support tube;
    an outlet coolant manifold disposed at the second end of the support tube; wherein
    the fourth linear segments of the stator coils joined to the inlet coolant manifold for introducing a flow of a coolant through the stator coils and the second linear segments of the stator coils are joined to the outlet coolant manifold for receiving the flow of coolant out of the stator coils.

* * * * *

UNITED STATES PATENT AND TRADEMARK OFFICE
CERTIFICATE OF CORRECTION

PATENT NO. : 7,619,345 B2
APPLICATION NO. : 11/344585
DATED : November 17, 2009
INVENTOR(S) : Kalsi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 848 days.

Signed and Sealed this

Twenty-sixth Day of October, 2010

David J. Kappos
*Director of the United States Patent and Trademark Office*